United States Patent [19]

Parker et al.

[11] 3,861,960

[45] Jan. 21, 1975

[54] METHOD OF PRODUCING A DRY CELL HAVING THIN FILM SEAL

[75] Inventors: Ronald S. Parker; Ronald Reilly, both of Teheran, Iran

[73] Assignee: Union Carbide Iran S.A., Teheran, Iran

[22] Filed: June 4, 1973

[21] Appl. No.: 366,439

Related U.S. Application Data

[62] Division of Ser. No. 240,919, April 4, 1972, Pat. No. 3,753,781.

[52] U.S. Cl.................. 136/107, 136/169, 136/175
[51] Int. Cl. .......................................... H01m 31/00
[58] Field of Search.... 136/107, 175, 169, 132–133, 136/131, 181

[56] References Cited

UNITED STATES PATENTS

| 1,564,951 | 12/1925 | Olaneta | 136/175 |
| 3,473,967 | 10/1969 | Leftault, Jr. et al. | 136/175 |

Primary Examiner—Anthony Skapars
Attorney, Agent, or Firm—Cornelius F. O'Brien

[57] ABSTRACT

A method for packaging a dry cell in an outer metal jacket and a dry cell construction employing a thin film seal covering one terminal of the cell, the seal being locked between the metal jacket and an insulating sleeve surrounding the cell.

8 Claims, 3 Drawing Figures

PATENTED JAN 21 1975 3,861,960
FIG. 1
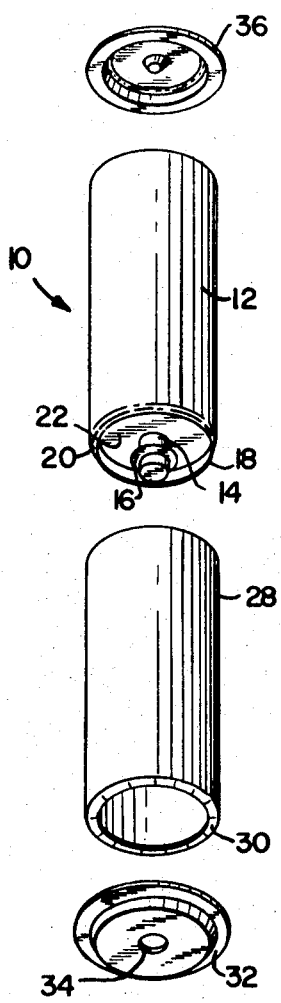
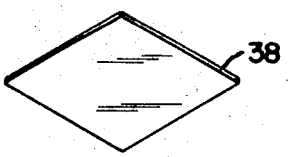
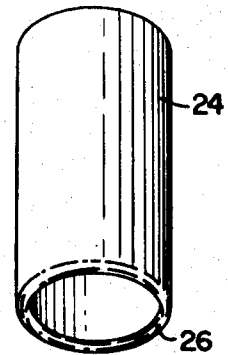
FIG. 2A
FIG. 2
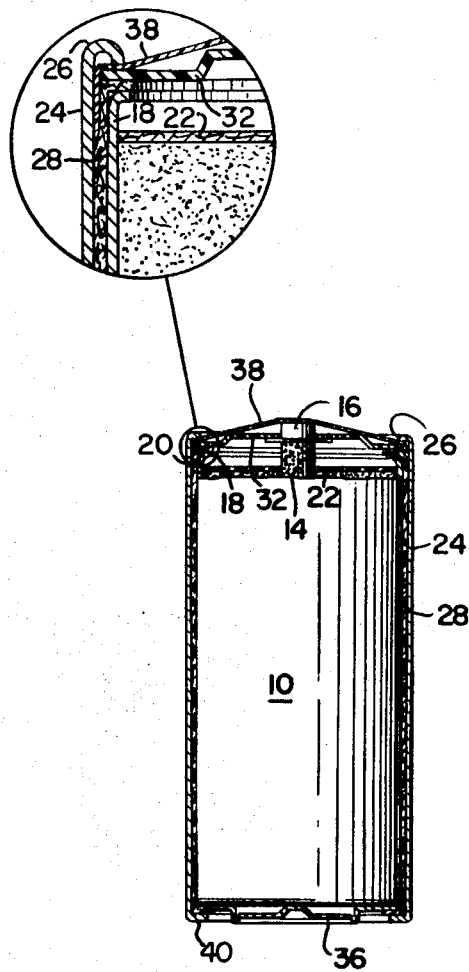

METHOD OF PRODUCING A DRY CELL HAVING THIN FILM SEAL

This is a division of application Ser. No. 240,919, filed Apr. 4, 1972, now U.S. Pat. No. 3,753,781.

This invention relates to a dry cell having a film seal at one end thereof and more particularly relates to a galvanic round dry cell of either primary or secondary type having a thin film seal at one end thereof which serves as a guarantee to the purchaser that the dry cell is fresh and unused at the time of purchase. The invention additionally relates to an improved method of fabricating such a cell.

One method of completing the manufacture of galvanic round dry cells which is commonly employed involves forming the dry cell in a cylindrical can which is closed at one end and open at the opposite end. This can serves as the cell anode and contains, in addition to the other parts of the cell, a carbon rod, which serves as the cell cathode collector and protrudes from the open end of the can. For the sake of appearance and to isolate the anode and cathode contacts to safeguard against accidental discharge, such a cell is packaged in an outer metal jacket which is electrically insulated from the cell. In localities where manual labor is plentiful or low in cost, this packaging technique is usually performed by hand and involves assembling the various components in inverted position. Into the inverted outer metal jacket is first inserted an insulating washer of plastic or other nonconductive material. An insulating jacket, e.g., of cardboard, of a diameter slightly smaller than the metal jacket is next inserted to completely insulate the outer metal jecket from the dry cell. The dry cell is then inserted within the insulating jacket, a metal bottom contact is added and the open end of the metal jacket is crimped to retain the various components in position.

Since the initial stage of this fabrication procedure involves inserting a small washer at the bottom of a metal jacket, difficulty has been encountered in precisely positioning this washer by hand. The washer is generally formed in a manner such that it must face in a predetermined direction to be useful and must properly seat at the bottom of the jacket on a lip provided for this purpose. In inserting the washer by hand it has been found that it may easily become inverted or out of alignment with the opening in the metal jacket thereby requiring its removal and repetition of this packaging operation. This repetition is both time consuming and frustrating to the packager and can substantially increase packaging time for the dry cell. In addition, if the washer becomes inverted and assembly is completed with the washer in its inverted position, the entire finished cell must be discarded or recycled to correct the error.

It has become desirable in recent years to employ a protective seal over one terminal of a dry cell in an attempt to guarantee to the purchaser that the cell is fresh and unused at the time of purchase.

It is an object of the present invention to provide an improved method for completing the fabrication of galvanic round dry cells and at the same time to produce a galvanic round dry cell having a film seal positioned over one of its external contact terminals.

This and other objects are accomplished by a method for packaging a dry cell in a cylindrical metal jacket including the steps of positioning an insulating film across and completely covering one end of the jacket, positioning an insulating disc of a diameter smaller than the diameter of the jacket on the insulating film in register with the periphery of the end of the jacket, ramming a cylindrical insulating sleeve into the jacket in a manner such that the insulating disc and insulating film are pushed ahead of the insulating sleeve through the bore of the jacket, and inserting the dry cell within the insulating sleeve. The cell package may then be closed in a conventional manner, e.g., insertion of a false bottom and crimping the metal jacket and insulating sleeve over the bottom.

In accordance with the present invention there is also provided a round dry cell construction which includes a cylindrical metal can, which is one electrode for the cell, having an electrode rod of opposite polarity protruding from one end thereof; a cylindrical metal jacket completely surrounding the cylindrical wall of the can and being crimped over the end of the can opposite to that from which the electrode rod protrudes; an insulating sleeve juxtaposed between the metal jacket and the can along the entire interface between the metal jacket and the can maintaining the jacket electrically insulated from the can, the periphery of the end of the can from which the electrode rod protrudes and the periphery of the end of the insulating sleeve and metal jacket proximate to the end of the can from which the electrode rod protrudes being curled inwardly to form mating inwardly disposed lips; and an insulating film seal locked between the lip and cylindrical wall of the metal jacket and the lip and cylindrical wall of the insulating sleeve, covering the end of the protruding electrode rod and entirely bridging the area between the rod and the lips. Preferably an insulating washer is provided to bridge the area between the electrode rod and the lip of the metal jacket and is locked between the insulating film and the lip of the insulating sleeve.

The invention will be more clearly understood from the following description thereof when read in conjunction with the accompanying drawings in which:

FIG. 1 is an exploded view showing the components and sequence of assembly of a dry cell in accordance with the present invention;

FIG. 2 is an elevational view partly in section of a completed galvanic round dry cell embodying the present invention; and FIG. 2A is an enlarged sectional view of the encircled portion of the cell shown in FIG. 2.

Referring to the drawings, and more particularly to FIG. 1, there is shown a primary Leclanche type galvanic round dry cell generally designated 10 which is formed in a zinc can 12, which serves as the cell anode. A carbon rod 14 extending from the open end of the can 12 is the cathode collector for the cell. This carbon rod 14 is pressure fitted with a metallic cap 16 which serves as the positive contact for the cell. The peripheral edge 18 of the open end of the zinc can 12 is bent inwardly to form an inwardly disposed lip 20 which acts to retain a sealing washer 22 in position.

Cell 10 is a complete and functioning dry cell and, for all practical purposes, could be used in the form shown in FIG. 1. However, for the sake of better sealing the cell, providing a cell of a better finished appearance, and better isolating the metallic cap 16 from the zinc can 12, it is desirable to package the cell 10 in an outer metal jacket 24 which is electrically insulated from the cell. Metal jacket 24 is cylindrical in shape and has one end curled inwardly to form an inwardly disposed lip 26 of the same general configuration as the lip 20 of the zinc can 12.

Another component of the cell package is a sleeve 28 of an insulating material, such as cardboard, which serves to insulate the zinc can 12 from the outer metal jacket 24. The insulating sleeve 28 is of a diameter slightly larger than than of the zinc can 12 but slightly smaller than that of the metal jacket 24. This difference in diameter permits the cell 10 to fit snugly within the sleeve 28 which fits snugly within outer metal jacket 24. The insulating sleeve 28 has the periphery of one of its ends bent inwardly forming an inwardly disposed lip 30 which is similar to the lip 20 of the zinc can 12 and the lip 26 of metal jacket 24.

An insulating washer 32, e.g., of a non-conductive plastic material, is provided to bridge the space between the metallic cap 16 of the cell 10 and the periphery of the cell to yield a neat looking closure which functions as an additional seal to prevent leakage. The washer 32 is of a size and shape which will permit it to fit within the metal jacket 24 and seat on the lip 26 of the metal jacket. The washer is provided with a central hole, defined by wall 34, of a size which will permit the head of the metallic cap 16 to protrude therethrough but which is smaller than the shoulder of the cap.

The other components of the cell are a metallic false bottom 36 of approximately the same diameter as the insulating washer 32 and a sheet of insulating film 38, e.g., of a thin plastic film, which is substantially larger than the diameter of the metal jacket 24.

The assembly of the cell 10 within its package follows the sequence shown in FIG. 1. The cell is assembled with each of the components in inverted position. The metallic jacket 24 is inverted and stood on end with the lip 26 at the bottom. The insulating film 38 is positioned over and rests on the upwardly disposed end of the metal jacket 24. Since the film 38 is larger than the diameter of the metal jacket 24, it will not fall within the metal jacket but rather will rest across the top of the open end of the jacket. The washer 32 is placed on top of the insulating film 38 and is supported by the film. The insulating sleeve 30 is positioned over the washer 32 with the lip 30 of the sleeve abutting against the washer. The sleeve 28 is pushed downwardly into the metal jacket 24 in a manner such that it rams the washer 32 and the insulating film 38 through the bore of the metal jacket 24 to the bottom of the jacket until the washer comes to rest on the lip 26 of the jacket. The washer is thereby locked between the lip 26 of the metal jacket 24 and the lip 30 of the insulating sleeve 28. The insulating film 38 has, in the same motion, been draped over the edges of the washer, and is locked between the side walls of the metal jacket 24 and the insulating sleeve 28.

The round dry cell 10 is slid into the insulating sleeve 28 until the peripheral edge 18 of the zinc can 12 comes to rest on the lip 30 of the insulating sleeve 28. The metallic cap 16 will thereby be caused to partially protrude through the hole defined by the wall 34 of the washer 32.

The false bottom 36 is inserted on top of the dry cell 10 and the open end of the metal jacket 24 is crimped over the false bottom 36 retaining same under pressure in electrical contact with the bottom of the zinc can 12. The insulating sleeve 28 is of a length slightly longer than the metal jacket 24. When the metal jacket is crimped over the false bottom 36, as shown at 40, the insulating sleeve is caused to fold on top of the edges of the false bottom and maintain the metal jacket out of contact with the false bottom. The outer metal jacket is thereby completely insulated from the false bottom 36 and the dry cell 10. This feature can clearly be seen from the drawing in FIG. 2 which shows the completed, packaged dry cell in an upright position.

As can be seen from FIG. 2, the insulating film 38 completely covers the cathode contact of the finished cell and the cell cannot be discharged until the insulating film is broken and removed. Once removed it would be impossible for a user to fabricate a new seal. A purchaser of a cell having a film seal over its cathode terminal is thereby assured that the dry cell has not previously been used nor accidentally discharged during storage or transportation.

The method of fabricating a dry cell package in accordance with the present invention is therefore useful in forming sealed cells and, at the same time, overcomes a problem which has been particularly troublesome in manually fabricating cells of this type in the past. As discussed above, this problem involves the positioning of the washer 32 within the metal jacket 24. Prior to the present invention it was necessary to drop the washer into the metal jacket while attempting to maintain the washer in a flat condition to cause it to seat on the lip 26 of the metal jacket. Through use of the present invention there is no possibility that the washer will become misaligned during insertion and proper seating within the metal jacket is assured.

From the above it will be obvious to those skilled in the art that a dry cell capable of being packaged in accordance with the present invention need not be formed in any special way and any conventional galvanic round dry cell, therefore, will be susceptible to packaging in accordance with the invention. The diameter, length or overall dimensions of the cell are not critical, it being necessary only that the relative sizes between the dry cell, the insulating sleeve, and the metal jacket be maintained and that the smallest dimension, other than thickness, of the insulating film be larger than the diameter of the metal jacket.

The insulating sleeve may be fabricated from any material which will electrically insulate the metal jacket from the dry cell proper. A cardboard or heavy paper sleeve is preferred due to its low cost and ease of fabrication but materials such as thermoplastic films, woven and non-woven fabrics etc, may also be employed.

The insulating washer can also be formed of any material which is electrically non-conductive. In this instance, however, a plastic disc is preferred since this part is visible in the finished cell and its appearance is important for aesthetic and marketing reasons. These same reasons apply to the selection of materials for construction of the outer metal jacket and false bottom for the cell. Since these are the parts of the cell which are visible to the purchaser, it is desirable to make them as attractive as possible. However, it will be appreciated by those skilled in the art that the particular materials of fabrication and method of forming the respective parts are not critical to the invention.

The insulating film which is used to form the protective seal of the finished cell may be formed of any thin, flexible material such as paper, woven or non-woven cloth, etc. Thermoplastic film is particularly preferred for this use since it is inexpensive, can be pulled taut and will conform to various shapes to yield a pleasing appearance. Moreover, the plastic film may be made transparent to better enable those purchasing the dry cell to appreciate the function of the film and the fact that it must be removed before the dry cell can be used. If desired, the film may be made opaque or a suitable message printed thereon, for example, instructing the consumer in the function of the seal and the best method for its removal. Another reason for the choice of a plastic film is that a thin thermoplastic film can easily be pierced by a user's fingernail thereby exposing the cathode contact of the battery and rendering the battery ready for use.

Preferred films for use in the present invention are from about 0.4 mil to about 5.0 mil thick thermoplastic films formed from materials such as, but not limited to, polyolefin resins, polyvinyl resins, polyvinylidene resins, etc. Particularly preferred due to their low cost and availability are films of resins such as polyethylene, polypropylene, polyvinylchloride, polyvinylidene chloride and copolymers thereof. It will be appreciated from the above description of the drawings that the shape and surface dimensions of the insulating film are not critical. To simplify cutting and avoid waste it is desirable to use a square swatch of film. The smallest surface dimension of the film should be at least about 0.1 inch larger than the diameter of the outer metal jacket of the cell. Preferably, the insulating film is about 0.25 to about 2.0 inches larger than the diameter of the metal jacket. In a typical packaging procedure for a flashlight battery, for example, the nominal outside diameter for the outer metal jacket would be about 1.3 inch and a suitable insulating film would be a square of 0.5 mil clear polyethylene film measuring 2.0 inches on each side.

It will be obvious that while the present invention has been described in detail it is nevertheless susceptible to modification and change within the scope of the invention. For example, in the detailed description of the method of assemblying the packaged dry cell, it is disclosed that the insulating sleeve is inserted within the outer metal jacket and that, thereafter, the dry cell is inserted within the sleeve. It will be obvious to those skilled in the art that the dry cell can first be inserted within the sleeve and the sleeve-dry cell combination can be inserted into the outer metal jacket. Other modifications will, of course, also be possible.

What is claimed is:

1. A method for packaging a dry cell in a cylindrical metal jacket comprising:
   positioning an insulating film across one end of said jacket to completely cover said end;
   positioning an insulating disc, of a diameter smaller than the diameter of said jacket, on said insulating film in register with the periphery of said end;
   ramming a cylindrical insulating sleeve into said jacket, through said end, in a manner such that said insulating disc and said insulating film are pushed ahead of said sleeve through the bore of said jacket; and
   inserting said dry cell within said insulating sleeve.

2. A method for packaging a dry cell in a cylindrical metal jacket comprising the steps:
   a. positioning an insulating film across one end of a cylindrical metal jacket with the opposite end of said jacket having an inwardly disposed lip;
   b. positioning an insulating disc having a diameter smaller than the diameter of said jacket, on said insulating film in register with the periphery of said jacket;
   c. pushing a cylindrical insulating sleeve having an inwardly disposed lip at one end into said cylindrical jacket in a manner such that the lip end of the sleeve rams the insulating disc and the insulating film through the bore of the jacket to the bottom of the jacket until the disc and insulating film come to rest on the lip of the jacket; and
   d. inserting a dry cell having an inwardly disposed lip at one end, within said insulating sleeve in such a manner that the lip end of the dry cell comes to rest on the lip of the insulating sleeve.

3. The method of claim 2 wherein the following step is added:
   e. crimping the end of the metal jacket and the end of the insulating sleeve over the end of the dry cell in a manner such that the outer metal jacket is completely insulated from the dry cell.

4. The method of claim 2 wherein the following steps are added:
   e. positioning a false bottom within said insulating sleeve in such a manner that it rests on top of the dry cell; and
   f. crimping the end of the metal jacket and the end of the insulating sleeve over said false bottom in a manner such that said false bottom is maintained in electrical contact with said dry cell and electrically insulated from said metal jacket, and in such a manner that the outer metal jacket is completely insulated from the dry cell.

5. A method for packaging a dry cell in a cylindrical metal jacket comprising the steps:
   a. positioning an insulating film across one end of a metal jacket to completely cover said end;
   b. positioning an insulating disc, of a diameter smaller than the diameter of said jacket, on said insulating film in register with the periphery of said end;
   c. inserting a dry cell into an insulating sleeve; and
   d. ramming said insulating sleeve containing said dry cell into the metal jacket, through said end, in a manner such that said insulating disc and said insulating film are pushed ahead of said sleeve through the bore of said metal jacket.

6. A method for packaging a dry cell in a cylindrical metal jacket comprising the steps:
   a. positioning an insulating film across one end of a cylindrical metal jacket with the opposite end of said jacket having an inwardly disposed lip;
   b. positioning an insulating disc having a diameter smaller than the diameter of said jacket, on said insulating film in register with the periphery of said jacket;
   c. inserting a dry cell having an inwardly disposed lip at one end into a cylindrical insulating sleeve having an inwardly disposed lip at one of its ends in such a manner that the lip end of the dry cell comes to rest on the lip of the insulating sleeve within said sleeve; and
   d. pushing said cylindrical insulating sleeve containing the dry cell into said cylindrical jacket in a manner such that it rams the insulating disc and the insulating film through the bore of the jacket to the bottom of the jacket until the disc and insulating film come to rest on the lip of the jacket.

7. The method of claim 6 wherein the following step is added:
   e. crimping the end of the metal jacket and the end of the insulating sleeve over the end of the dry cell in a manner such that the outer metal jacket is completely insulated from the dry cell.

8. The method of claim 6 wherein the following steps are added:
   e. positioning a false bottom within said insulating sleeve in such a manner that it rests on top of the dry cell; and
   f. crimping the end of the metal jacket and the end of the insulating sleeve over said false bottom in a manner such that said false bottom is maintained in electrical contact with said dry cell and electrically insulated from said metal jacket, and in such a manner that the outer metal jacket is completely insulated from the dry cell.

* * * * *